Figure 1:
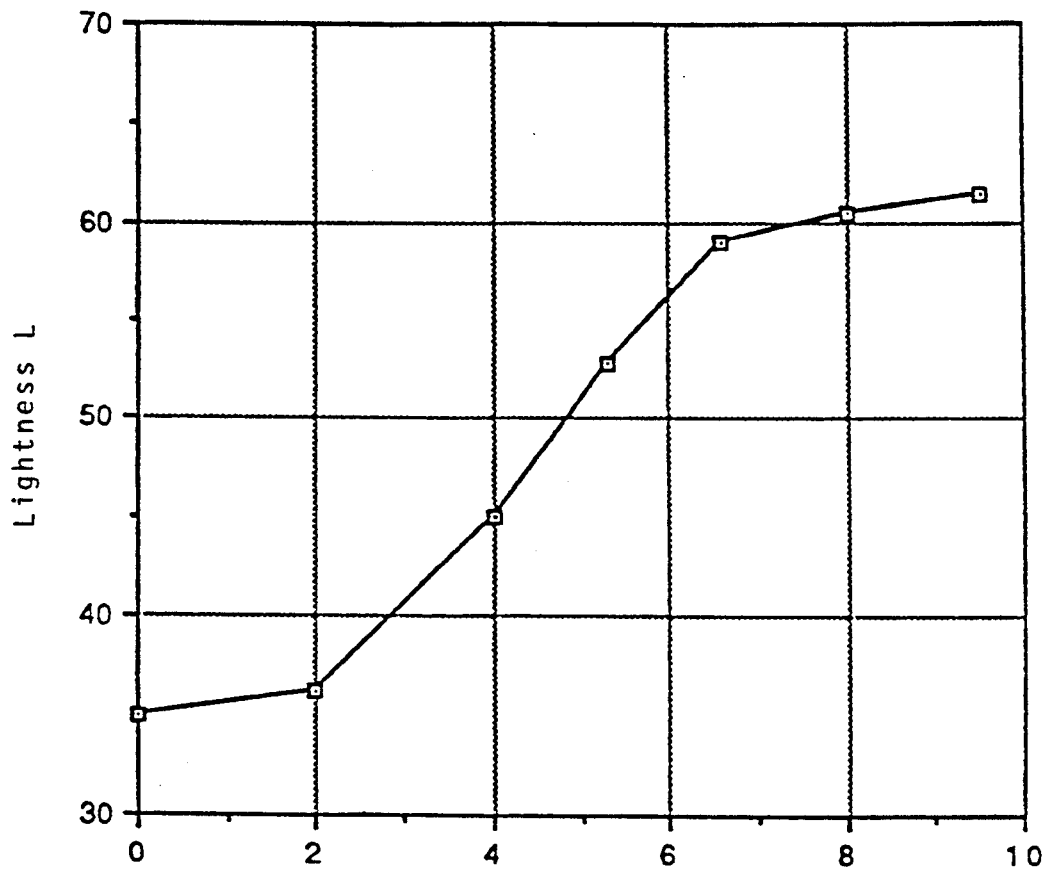

United States Patent [19]
Podestá

[11] Patent Number: 5,296,415
[45] Date of Patent: Mar. 22, 1994

[54] OPACIFIED ENAMEL FOR DIRECT-ON ENAMELLING ON UNPICKLED STEEL PLATE

[75] Inventor: Wolfgang Podestá, Varsenare, Belgium

[73] Assignee: Bayer AG, Leverkusen

[21] Appl. No.: 911,892

[22] Filed: Jul. 10, 1992

[30] Foreign Application Priority Data

Jul. 26, 1991 [DE] Fed. Rep. of Germany ....... 4124801

[51] Int. Cl.$^5$ ........................... C03C 8/06; C03C 8/02
[52] U.S. Cl. ...................................... 501/25; 501/14;
501/17; 501/21; 501/58; 501/59; 501/63;
501/67; 501/72; 428/325; 428/243; 428/426;
428/432; 428/26
[58] Field of Search ................ 501/14, 17, 21, 25,
501/27, 58, 59, 67, 71, 72, 63; 427/409, 427,
435; 428/325, 343, 426, 432; 148/26

[56] References Cited

U.S. PATENT DOCUMENTS

| | | |
|---|---|---|
| 2,396,856 | 3/1946 | King, Jr. ........................... 106/48 |
| 3,556,821 | 1/1971 | Hanzlik et al. .................... 501/25 |
| 3,899,324 | 8/1975 | Corbett ............................. 501/25 |
| 4,193,808 | 3/1980 | Khodsky et al. .................. 501/25 |
| 4,493,900 | 1/1985 | Nishino et al. ................... 501/26 |
| 4,975,391 | 12/1990 | Shimizu et al. .................. 501/21 |
| 5,075,263 | 12/1991 | Schittenhelm et al. ........... 501/25 |

FOREIGN PATENT DOCUMENTS

0425927  5/1991  European Pat. Off. .
2495190  6/1982  France .

OTHER PUBLICATIONS

Derwent Database Abstract, SU 945 112, Jul. 23, 1982.
Derwent Database Abstract, DD 251 743, Nov. 25, 1987.
Chemical Abstracts, vol. 110, No. 10, 178391f, p. 329, May 15, 1989 and PL-A-141 766 (Instytut Szkla I Ceramiki) Jun. 30, 1988.
A. I. Nedelkovic & M. R. L. Cook, Mitteilungen der Vereins Deutscher Emailfachleute, Band 20/ 1972, pp. 121–132.
A. Dietzel: Emaillierung, Springer-Verlag, Berlin, 1981, pp. 126–128.
DEZ-Merkblatt, F 6.2, pp. 1–3. "Date unknown".
DIN ISO 2722, Nov. 1981, pp. 1–4.
DIN ISO 2744, Nov. 1984, pp. 1–5.
Weyl, "Coloured Glasses", Society of Glass Technology, 1967, pp. 230–231.

Primary Examiner—Mark L. Bell
Assistant Examiner—Michael Marcheschi
Attorney, Agent, or Firm—Connolly & Hutz

[57] ABSTRACT

A $CeO_2$-containing enamel frit is disclosed which, upon enamelling, produces an opaque enamel coating with excellent adhesion and acid resistance. The frit can be used to enamel an unpickled or lightly pickled steel plate or article.

9 Claims, 1 Drawing Sheet

$CeO_2$ content in % by weight

OPACIFIED ENAMEL FOR DIRECT-ON ENAMELLING ON UNPICKLED STEEL PLATE

This invention relates to opacified enamel frits which recrystallize during firing for obtaining light colors for one-coat (direct) enamelling on unpickled steel plate.

Direct enamels for one-coat enamelling on degreased-only or degreased and mildly pickled (non-nickel-plated) steel plate generally have two functions to perform, namely: on the one hand, they must establish a firm bond between steel and enamel in a firing time of generally 2 to 8 minutes, on the other they must provide the desired color, lightness, surface texture and chemical resistance to water, acids and bases.

In addition, the properties of the enamel coating can be influenced to a certain extent by addition of inert materials, pigments, matting or opacifying agents and other mill additives.

To obtain good enamel adhesion, it is necessary to include transitional metal oxides, such as for example CoO, NiO, $Fe_2O_3$, MnO, into the enamel-composition in quantities of generally 1 to 5% by weight (total). Through the very dark color of these adhesion-promoting oxides, the enamel coatings are also generally dark in color (dark blue, dark brown, black, dark green, etc.).

Lighter one-coat enamel finishes can be obtained by fusing relatively large quantities of antimony oxide into enamels with no coloring constituents. In this case, the antimony oxide used as adhesion promoter also acts as an opacifier. However, enamels based on antimony oxide generally do not satisfy the requirements which modern enamels are expected to meet (resistance to acids, adhesion of the enamel to decarburized steel).

Another method of obtaining light one-coat enamel finishes is to use nickel-plated steel plate to which opacified enamels can be firmly applied without intensively coloring constituents (adhesive oxides). However, this widely used alternative, which is also known as direct white enamelling, has the disadvantage of a very complicated pretreatment (pickling, nickel plating) and the resulting costs and ecological problems.

The boron/titanium white enamels used for direct white enamelling, which are opacified by recrystallization (separation of $TiO_2$ crystals from the glass matrix during firing), cannot be used as a direct enamel on unpickled steel plate, even where adhesion-promoting transition metal oxides (CoO, NiO) are introduced, because the $TiO_2$ present in large quantities passivates the steel surface through the formation of iron titanate and, in doing so, largely removes it from the adhesion-promoting reaction with the adhesive oxides present in the enamel (cf. A. Dietzel: Emaillierung, Springer-Verlag, Berlin, 1981, pages 126–128).

In general, direct enamels based on other opacifying constituents are completely or substantially unsuitable either because the refractive index of the separating crystal phase is low ($CaF_2$) or because the crystal phase dissolves (partly) in the glass matrix ($ZrSiO_4$, $ZrO_2$).

Hitherto, enamels based on $CeO_2$ as opacifier have been used solely as cover-coat enamels or as direct white enamels on nickel-plated steel (cf. A. I. Nedelkovic, M. R. L. Cook, Mitteilungen der Vereins Deutsche Emailfachleute 20, 1972, pages 121 et seq.).

Although the enamel composition for direct enamelling described in U.S. Pat. No. 4,975,391 also contains $CeO_2$ as a constituent, the described enamels with their comparatively high content of $SiO_2$, $TiO_2$ and $ZrO_2$ are specifically intended for the enamelling of reactors for chemical apparatus and are not used to obtain light recrystallizing enamel coatings.

In addition, the compositions mentioned are very general so that it is difficult to determine how resistance to acids, enamel adhesion and color/lightness can be combined in the required manner.

Special enamels containing (coloring) adhesive oxides carefully adapted to one another are generally used in practice for the one-coat enamelling of lighter colors on unpickled steel, the lightness of the enamel coating being varied as required by addition of opacifiers to the mill (for example $TiO_2$, $ZrO_2$, $Sb_2O_3$, $SnO_2$).

However, this process leads on the one hand to deteriorations in various properties of the enamel coatings (adhesion, gloss, resistance to acids, etc.), on the other hand the opacity obtained is not optimal because the opacifiers undergo partial dissolution during firing of the enamel. In addition, separation during processing and hence color shifts can occur on account of the difference in density between the opacifier and the enamel frit.

Accordingly, the problem addressed by the present invention was to develop an enamel composition which, on the one hand, would contain the (colored) adhesive oxides required for good adhesion development and which, on the other hand, would mask the comparatively dark color of the glass matrix through separation of a crystal phase of high refractive index (highly opacifying) during firing of the enamel without any adverse effect on the desired properties of the enamel (adhesion, chemical stability, smooth surface).

This problem has been solved by the provision of the enamel frits according to the invention.

It has surprisingly been found that direct enamel frits consisting essentially of a glass matrix of 40 to 60% by weight ($SiO_2 + ZrO_2$) with a molar ratio of $SiO_2$ to $ZrO_2$ of >10, 10 to 20% by weight alkali metal oxides with an $Na_2O$ to ($Li_2O + K_2O$) molar ratio of >0.8, 8 to 18% by weight $B_2O_3$, 0 to 15% by weight CaO+BaO+MgO+ZnO, 0 to 8% by weight $TiO_2$, 0 to 4% by weight $P_2O_5$, 0 to 4% by weight $Al_2O_3$, 0.3 to 5% by weight fluorine in the form of fluorides, 1.5 to 5% by weight adhesion-promoting constituents from the group consisting of CoO, NiO, CuO, the CuO having to be present in a quantity of 0 to 2.5% by weight and the CoO and NiO each having to be present in a quantity of 0.2 to 3.5% by weight, and of 2.5 to 9% by weight, preferably 4–9% by weight, $CeO_2$, lead to distinct opacity of the enamel coating through the separation of $CeO_2$ crystals during firing of the enamel without any adverse effect on other desired properties of the enamel, including for example adhesion or resistance to acids.

The enamels according to the invention may additionally contain MnO, $Fe_2O_3$ or other coloring constituents in a quantity of up to 6% by weight and also 0 to 2% by weight $Sb_2O_3$. Other advantageous embodiments are described herein.

Electron micrographs surprisingly show that the $CeO_2$ crystallites formed during firing of the enamel are present in an optimal particle size for light refraction of 0.1 to 1 μm (half the wavelength of light), the quantity of $CeO_2$ precipitated based on the $CeO_2$ used being distinctly more than 50% at firing temperatures of 800° to 840° C. such as are typically applied in enamelling. Accordingly, the recrystallization of $CeO_2$ takes place more effectively in the enamel frits according to the invention than the separation of $TiO_2$ in boron/titanium white enamels.

It has also surprisingly been found that the high-melting $CeO_2$ (Mp.=2,870° C.) used as starting material does not significantly increase either the viscosity or the softening temperature of the frit. This is particularly important for the application of direct enamels to unpickled steel because it is only enamels having a comparatively low softening point (for example <535° C.) which guarantee an early adhesion reaction between enamel and steel and sufficiently smooth levelling of the enamel over a firing time of 2 to 8 minutes.

The enamels according to the invention are suitable for slip application by flood coating, dip coating or spray coating, although they may also be applied to the plate to be enamelled by electrophoretic deposition. Effective masking of the iron-rich interlayer formed at the steel/enamel interface during firing of the enamel always presupposes a minimum layer thickness of 80 to 90 μm enamel.

The enamels according to the invention are fused from typical enamel raw materials, such as borax ($Na_2B_4O_7 \cdot 5 H_2O$), quartz, sodium polyphosphate, feldspar, zircon, silicate, fluorspar, alkali metal and alkaline earth metal carbonates, $CeO_2$ having a purity of at least 92% and the necessary (coloring) transition metal oxides at temperatures of 1,100° to 1,260° C. and are quenched on water-cooled steel rollers. The flakes thus formed are wet-ground using various mill additives and are applied as an aqueous suspension in slip form to 0.5 to 3 mm thick steel plates by dip coating or spray coating or by electrophoretic deposition and are then fired at a temperature in the range from 780° to 860° C. either in a box furnace or in a temperature gradient furnace.

The layer thickness of the direct enamel finishes are between 0.05 and 0.25 mm. Enamel adhesion was tested with a dropped ball (DEZ Merkblatt F 6.2) with deformation of the enamelled plates and visual evaluation of the adhesion pattern. Resistance to cold citric acid and water/steam was evaluated on 100×100×1 mm enamelled plates in accordance with DIN-ISO 2722 and DIN-ISO 2744. Opacity (lightness) was evaluated visually and colorimetrically using the CIE-LAB system.

The invention is illustrated by the following Examples.

EXAMPLE 1

In order to test the lightness-increasing effect of $CeO_2$ in enamels, standard direct enamels for only degreased steel plate were modified so that, essentially, part of the $SiO_2$ present as principal component was replaced by $CeO_2$.

The effect of the $CeO_2$ in the enamel on various properties thereof is illustrated with reference by way of example to frits 1 and 4 of which the composition is shown in Table I (frit 1 contains 6.7% $CeO_2$).

The enamel finishes were prepared by wet grinding of the frits with 10% quartz, 5% clay, 0.25% borax, 0.1% sodium nitrite and 50% water (based on 100 parts frit), subsequent application of the slip obtained by spray coating or dip coating to steel plates measuring 100×100×1 mm, drying of the enamel biscuit obtained and firing for 4 minutes at 820° C., the thickness of the enamel layer after firing being between 0.15 and 0.20 mm.

As can be seen from Table I, the $CeO_2$-containing enamel 1 and the comparable $CeO_2$-free enamel 4 differ only very slightly in their softening temperatures. Since the two enamel frits have the same contents of adhesive oxides (CoO, NiO, CuO), it is not surprising that the adhesion of the enamels to EK 4-Normal steel and to decarburized ED 3 steel should also be comparable. Accordingly, the effect of $CeO_2$, if any, on enamel adhesion must be regarded as very slight.

TABLE I

| Composition [by weight] | Frit 1 | Frit 2 | Frit 3 | Frit 4 |
|---|---|---|---|---|
| $SiO_2$ | 47.1 | 46.2 | 45.9 | 51.7 |
| $ZrO_2$ | — | — | 1.0 | 1.0 |
| $CeO_2$ | 6.7 | 4.0 | 7.9 | — |
| $TiO_2$ | 4.3 | 5.0 | 2.4 | 4.3 |
| $P_2O_5$ | — | 1.0 | 1.3 | 0.9 |
| $B_2O_3$ | 15.7 | 16.8 | 12.1 | 15.8 |
| $Al_2O_3$ | 0.9 | 0.8 | 1.1 | 0.8 |
| $Na_2O$ | 13.8 | 11.0 | 9.9 | 13.8 |
| $K_2O$ | 0.6 | 1.0 | — | 0.6 |
| $Li_2O$ | 2.0 | 3.3 | 3.8 | 2.1 |
| MgO | 0.1 | — | — | — |
| CaO | 0.7 | 2.6 | 4.2 | 0.7 |
| BaO | — | 2.3 | 2.7 | — |
| ZnO | — | 1.3 | — | — |
| MnO | 1.5 | 0.5 | 1.7 | 1.5 |
| $Fe_2O_3$ | 2.4 | — | 1.1 | 2.4 |
| CoO | 0.4 | 0.6 | 0.4 | 0.4 |
| NiO | 1.8 | 1.6 | 2.3 | 1.8 |
| CuO | 0.5 | 0.3 | 0.5 | 0.5 |
| $Sb_2O_3$ | — | 0.5 | — | — |
| F | 2.5 | 1.8 | 2.2 | 2.5 |
| Softening point $T_E$ | 498° C. | 505° C. | 499° C. | 499° C. |
| Lightness L | 59.1 | 44.9 | 59.0 | 35.4 |
| Enamel adhesion EK-4* | 2 | 1 | 1 | 2 |
| Enamel adhesion ED-3* | 2 | 3 | 1 | 3 |
| Resistance to citric acid acc. to DIN-ISO 2722 | B | AA | A | B |

*Based on a firing temperature of 820° C.
1 = very good, 5 = no adhesion

The resistance of the two enamel coatings 1 and 4 to cold 10% citric acid (see Table I) and water/steam at 100° C. is also comparable.

By contrast, the lightness values L of enamel coatings 1 and 4 differ distinctly from one another (ΔL=24) which is attributable to the intensive crystallization of $CeO_2$ in frit 1.

In addition, the dependence of lightness on layer thickness and the firing temperature was determined on gradient strips measuring 60×450×1 mm. It was found that the enamel coating obtained with frit 1 is highly stable in regard to lightness and color at temperatures of 780° to 845° C. Variations in the layer thickness of 0.12–0.20 mm also produced no significant differences in lightness.

EXAMPLE 2

This Example is intended to demonstrate the effect of a comparatively small addition of $CeO_2$ (compared with Example 1) to a particularly acid-resistant enamel frit (frit 2).

Despite comparable production of the enamel or rather the enamel coating, an addition of only 4% by weight $CeO_2$ produces an increase in lightness ΔL of +10 compared with the $CeO_2$-free frit 4, but a distinct reduction in lightness ΔL of −10 compared with frit 1 containing 6.7% by weight $CeO_2$. The lightness value continues to decrease with decreasing $CeO_2$ content, so that the minimum content of 2.5% by weight $CeO_2$ mentioned in claim 1 represents the absolute lower limit. To obtain a major difference in lightness in relation to $CeO_2$-free direct enamels, additions of 4.5 to 6.5% by weight $CeO_2$ are generally necessary — even larger additions, for example, 6.5-9% by weight being required in some cases.

EXAMPLE 3

As with the frits of Examples 1 and 2, $CeO_2$-containing enamels are suitable for electrophoretic application. This is illustrated with reference to frit 3 in Table 1.

First of all, frit 3, which had been obtained in the same way as enamels 1 and 2 by melting the corresponding raw materials in a 700 ml crucible for 35 minutes at 1,230° C., followed by quenching in water, was ground in accordance with the following mill batch containing water and slip-stabilizing additives to a fineness of 8 on a Bayer test sieve (16,900 meshes):

| Frit | 100% by weight |
|---|---|
| Quartz | 8.8% by weight |
| Clay | 2.5% by weight |
| Bentonite | 0.8% by weight |
| Relatin | 0.1% by weight |
| NaCl | 0.01% by weight |
| Water | 55% by weight |

The pH and viscosity of the slip were then adjusted to >10.5 and 110 mPa.sec, respectively, by addition of water, sodium hydroxide or sodium aluminate. The slip conductivity of approx. 3,000 μS thus guaranteed uniform coating with high coverage.

Electrophoretic deposition of the enamel onto degreased low-carbon enamelling plates measuring 70×110×1 mm was carried out with a current of 5 to 10 amperes and a volatage of approx. 50 volts, so that a layer thickness of 0.18 mm was obtained after firing. Firing was carried out for 3 to 4 minutes at 830° to 840° C. in a box furnace.

The enamel coatings obtained were characterized by very good enamel adhesion, resistance to cold citric acid and hot water/steam and by a uniform, smooth surface which was easy to clean. The lightness of the enamel coating corresponded to that of the enamel finish obtained by spraying with frit 1 and, accordingly, was also ΔL= +24 above the $CeO_2$-free enamel coating based on frit 4.

The main difficulty in the development of frits 1 to 3 lay in optimally combining the opacity produced by the recrystallization of $CeO_2$ and adhesion of the enamel. It was found to be necessary to keep the content of coloring adhesive oxides (CoO, NiO, CuO) by suitable mixing with one another and with non-coloring adhesion-promoting constituents. CuO and fluorine play a particularly important role in this regard, as will be illustrated in Example 4.

EXAMPLE 4

Starting out from enamel 5 (see Table II), which contains 5.5% by weight $CeO_2$, 0.5% CuO and 1.7% fluorine in the form of fluorides, frits free from CuO and fluorine (5 A, 5 B) were melted and applied as enamels as described in Example 1. The properties of the corresponding enamel finishes are shown in Table II.

It is clear from Table II that the omission of only 0.5% by weight CuO from frit 5 A leads to a drastic deterioration in the adhesion of the enamel which is greater on decarburized steel (ED 3 steel) than on carbon-containing steel (EK 4). Resistance to cold citric acid remains substantially unaffected while lightness increases slightly by Δl= +0.5 by virtue of the missing CuO.

Although, on the other hand, the reduction in the fluorine content to 0% by weight (frit 5 B) leads to a slight improvement in the resistance to cold citric acid (AA), it also leads to an almost equally drastic reduction in adhesion as in the case of the CuO-free enamel coating. In addition, the lightness of the fluorine-free variant is lower than that of the fluorine-containing frit by Δl= −0.8 which can be explained by the nucleating effect of the fluorine.

Overall, the Examples clearly show that the degree of lightness is influenced primarily by the $CeO_2$ content of the frit. By contrast, with $CeO_2$ contents above 9% by weight, there is only a slight change in the lightness of the enamel frits according to the invention (direct enamels for only degreased steel). FIG. 1 shows the dependence of the lightness of enamelled steel plates on the $CeO_2$ content.

TABLE II

| Composition | Frit | | |
|---|---|---|---|
| [% by weight] | 5 | 5A | 5B |
| $SiO_2$ | 50.4 | 50.7 | 50.4 |
| $CeO_2$ | 5.3 | 5.5 | 5.5 |
| $TiO_2$ | 3.5 | 3.5 | 3.5 |
| $B_2O_3$ | 12.5 | 12.6 | 12.5 |
| $Al_2O_3$ | 1.0 | 1.0 | 1.0 |
| $Na_2O$ | 10.4 | 10.5 | 10.4 |
| $P_2O_5$ | 0.4 | 0.4 | 0.4 |
| $Li_2O$ | 3.6 | 3.6 | 3.6 |
| CaO | 4.3 | 4.3 | 4.3 |
| BaO | 2.8 | 2.8 | 2.8 |
| MnO | 1.9 | 1.9 | 1.9 |
| $Fe_2O_3$ | 1.0 | 1.0 | 1.0 |
| CoO | 0.4 | 0.4 | 0.4 |
| NiO | 2.0 | 2.0 | 2.0 |
| CuO | 0.5 | — | 0.5 |
| F | 1.5 | 1.5 | — |
| Lightness L | 52.8 | 53.3 | 52.0 |
| Resistance to citric acid (DIN-ISO 2722) | A | A | AA |
| Enamel adhesion EK-4 | 1 | 3 | 3 |
| Enamel adhesion ED-3 | 1 | 5 | 4 |

*Based on a firing temperature of 820° C.
1 = very good, 5 = no adhesion

In addition, the Examples show that, in the development of $CeO_2$-containing direct enamels, it is important to ensure that no more than absolutely necessary of coloring constituents, particularly CoO, should be used because otherwise the opacity produced by $CeO_2$ is readily eliminated. Accordingly, it is of advantage to limit the percentage content of MnO, $Fe_2O_3$ and other coloring constituents to a total of 6% by weight and the percentage content of adhesive oxides (CoO, NiO, CuO) to a total of at most 5% by weight, but preferably 3% by weight.

What is claimed is:

1. An enamel frit for the direct-on enamelling of non-nickel-plated enamelling steel to form an opaque, acid-resistant enamel coating having good adhesion to the steel, the frit comprising the following glass-forming constituents:

40 to 60% by weight $SiO_2+ZrO_2$ with an $SiO_2$ to $ZrO_2$ molar ratio of greater than 10;

10 to 20% by weight alkali metal oxide with an $Na_2O$ to $(Li_2O+K_2O)$ molar ratio of greater than 0.8;

8 to 18% by weight $B_2O_3$;

0 to 15% by weight of combined CaO, BaO, MgO and ZnO;

0 to 8% by weight $TiO_2$;

0 to 4% by weight $P_2O_5$;

0 to 4% by weight $Al_2O_3$;

0.3 to 5% by weight fluorine in form of fluorides;
0.2 to 3.5% by weight NiO;
0.2 to 3.5% by weight CoO;
0 to 2% by weight $Sb_2O_3$;
0.2 to 2.5% by weight CuO;
2.5 to 9% by weight $CeO_2$; and other coloring constituents in quantities of up to 6% by weight, wherein the $CeO_2$ has a purity of at least 92% and is not contaminated with natural minerals.

2. A frit as claimed in claim 1, wherein the adhesion-promoting constituents NiO, CoO and CuO are present in the composition in a total quantity of 1.5 to 5% by weight.

3. A frit as claimed in claim 1, wherein the content of fluorine in the form of fluorides is from 0.5 to 4% by weight.

4. A frit as claimed in claim 1, wherein the percentage of $Li_2O$ is 1.5 to 5.5% by weight and the total $Li_2O+TiO_2$ content is 3 to 11% by weight.

5. A frit as claimed in claim 1, additionally containing MnO or $Fe_2O_3$ which, in combination with the coloring constituents, do not exceed 6% by weight.

6. A steel article or plate enamelled with the enamel frit of claim 1.

7. A steel article or plate as claimed in claim 6, wherein the steel article or plate is unpickled and non-nickel-plated.

8. An enamel frit for the direct-on enamelling of non-nickel-plated enamelling steel to form an opaque, acid-resistant enamel coating having good adhesion to the steel, the frit comprising the following glass-forming constituents:

40 to 60% by weight $SiO_2+ZrO_2$ with an $SiO_2$ to $ZrO_2$ molar ratio of greater than 10;
10 to 20% by weight alkali metal oxide with an $Na_2O$ to $(Li_2O+K_2O)$ molar ratio of greater than 0.8;
8 to 18% by weight $B_2O_3$;
0 to 15% by weight of combined CaO, BaO, MgO and ZnO;
0 to 8% by weight $TiO_2$;
0 to 4% by weight $P_2O_5$;
0 to 4% by weight $Al_2O_3$;
0.3 to 5% by weight fluorine in form of fluorides;
0.2 to 3.5% by weight NiO;
0.2 to 3.5% by weight CoO;
0 to 2% by weight $Sb_2O_3$;
0.2 to 2.5% by weight CuO;
4.0 to 9% by weight $CeO_2$;
and other coloring constituents in quantities of up to 6% by weight, wherein the $CeO_2$ has a purity of at least 92% and is not contaminated with natural minerals.

9. A frit as claimed in claim 8, wherein the content of $CeO_2$ in the frit is from 6.5 to 9% by weight.

* * * * *